R. J. BARR.
Velocipede.

No. 94,992. Patented Sept. 21, 1869.

Witnesses
Isaac R. Oakford
Richard R. Law

Inventor
Robert J. Barr
Per C. H. Evans
Atty

United States Patent Office.

ROBERT J. BARR, OF PHILADELPHIA, PENNSYLVANIA.

Letters Patent No. 94,992, dated September 21, 1869.

IMPROVEMENT IN VELOCIPEDES.

The Schedule referred to in these Letters Patent and making part of the same.

*To all whom it may concern:*

Be it known that I, ROBERT J. BARR, of the city of Philadelphia, county of Philadelphia, and State of Pennsylvania, have invented a new and useful "Improvement in Velocipedes;" and I do hereby declare that the following is a full, clear, and exact description of the construction and operation of the same, reference being had to the accompanying drawings, and to the letters of reference marked thereon.

My invention consists in the peculiar manner of propelling and guiding the velocipede, whereby great speed is attained, and perfect control had in guiding it.

To accomplish this, I use endless chains, which run over pulleys connected with the front axle, and which are operated, through the cranks, by means of the hands and feet.

The mechanism for guiding consists of rods and cranks, operated from the seat, and acting on the rear axle, all of which will be fully described hereinafter.

Figure 1:
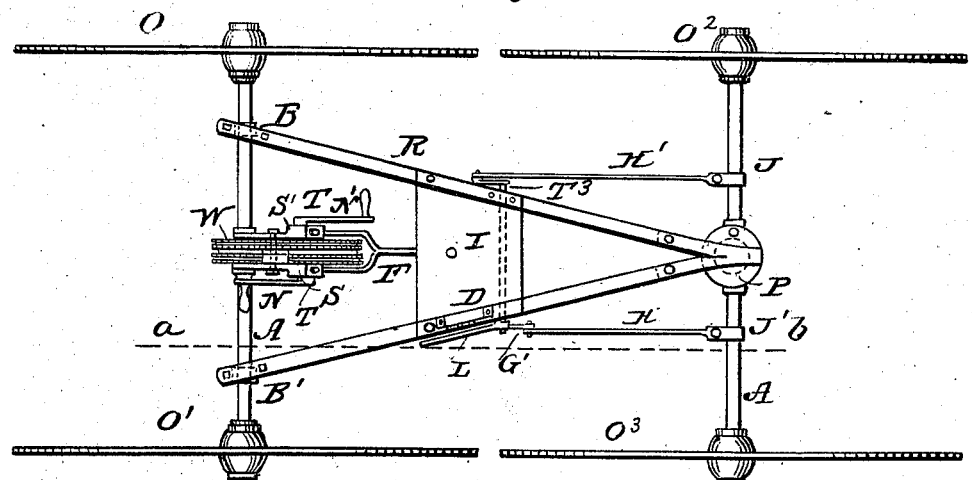
Figure 1 is a plan view of my invention.
Figures 2, 3:
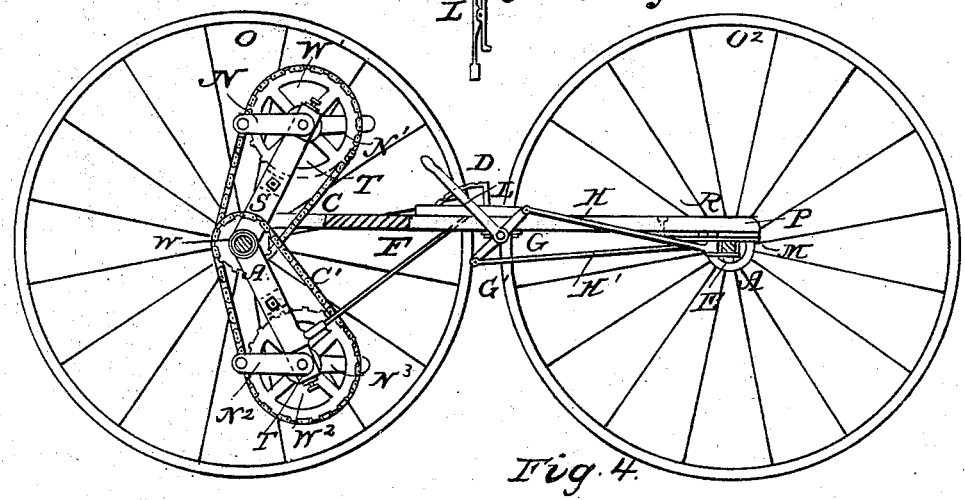
Figure 2 is a side elevation on the line *a–b* of fig. 1.
Figure 3 is a view, detached, of the lever and clutch used in guiding.
Figure 4:
Figure 4 is a sectional view, detached, of the plates connected at the centre of the rear axle.

To enable those skilled in the art to make and use my invention, I will proceed to describe its construction and operation.

The front axle A consists of a circular shaft, provided, at a short distance from its ends, with journals and bearings B and B'.

The said bearings are secured to the under side of the front ends of the reach R, which is made triangular in shape, and pivoted, at the vertex, to the centre of the rear axle A' by means of the bolt E.

Said bolt passes through the centre of the circular plate P, which is secured to the under side of the reach R, and, through the rim M, secured to the upper edge of the axle A', so that in guiding the velocipede, the plate P will turn freely on the rim M.

Secured on the axle A, at the centre, is a chain-wheel, W, on each side of which are placed two cast or wrought-iron supports, S and S', held together by means of bolts and nuts, and arranged so that the axle A will turn freely in them.

The supports S and S' are made angular in shape, so that their upper and lower ends will incline toward the centre of the velocipede, and are provided with adjustable bearings, through which are passed and work the shafts T and T¹.

On each of the said shafts, and between the supports S and S', are secured two chain-wheels, W¹ and W², over which are passed the endless chains C and C'.

These chains also pass over the chain-wheel W, secured to the axle A, and are tightened by means of the adjustable bearings in the supports S and S'.

The face of each of the chain-wheels W, W¹ W², and W³ is made with depressions, to suit the form of the links in the chains.

The ends of the shafts T and T¹ are provided with cranks N, N¹, N², and N³.

The cranks of the shaft T are arranged so as to be turned by the hands, and the cranks on the shaft T¹ by the feet of the operator.

Additional stiffness is given to the lower part of the supports S and S' by means of the brace F, which is attached to them, and the opposite end secured to the under side of the seat J.

Said seat is secured on top, and at the centre of the reach R, and has placed underneath, and working in suitable bearings, a shaft, T², provided with cranks G and G'.

These cranks have connected to them two rods, H and H', the opposite ends of which fit and turn in straps J and J', secured to the rear axle A'.

The cranks G and G' are operated by means of the side lever L, which is within convenient reach of the seat I, and is provided with a clutch, U, which engages with notches cut in the rack D.

The axles A and A' are mounted on wheels O, O¹, O², and O³, of ordinary construction.

To propel the velocipede, the operator, occupying the seat I, places the feet on the cranks N² and N³, and grasps the handles of the cranks N and N¹, and puts them in motion by alternate movement of the hands and feet, thus producing a continuous rotary motion of the chains, which impart motion to the axle A, and overcome all dead-centres.

In guiding the velocipede to the right or left, the lever L is thrown up or down, and the rear wheels turned in a corresponding direction; and, when propelled in a direct line, the clutch U on the lever L is engaged in the proper notch in the rack D.

Having thus described my invention, its construction, and operation,

What I claim, and desire to secure by Letters Patent of the United States, is—

1. The arrangement of the revolving axle A, chain-wheel W, supports S and S', shafts T and T¹, chain-wheels W¹ and W², cranks N, N¹, N², and N³, endless chains C and C', bearings B and B', and brace F, substantially as and for the purpose set forth.

2. The arrangement of the reach R, seat I, plate P, rim M, bolt E, shaft T², cranks G and G', rods H and H', straps J and J', axle A', lever L, clutch U, and rack D, as and for the purpose set forth.

In testimony whereof, I have hereunto signed my name, in the presence of two subscribing witnesses.

ROBERT J. BARR.

Witnesses:
CHARLES H. EVANS,
ISAAC R. OAKFORD.